(12) United States Patent
Zeiler et al.

(10) Patent No.: US 9,670,978 B2
(45) Date of Patent: Jun. 6, 2017

(54) PARKING BRAKE

(71) Applicant: AGCO International GmbH, Hesston, KS (US)

(72) Inventors: Hans-Peter Zeiler, Marktoberdorf (DE); Josef Ammann, Marktoberdorf (DE); Bernhard Hoeldrich, Marktoberdorf (DE); Klaus Brugger, Marktoberdorf (DE); Peter Miller, Marktoberdorf (DE); Karl Braeckle, Marktoberdorf (DE); Martin Dreier, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 14/801,360

(22) Filed: Jul. 16, 2015

(65) Prior Publication Data
US 2016/0201746 A1    Jul. 14, 2016

(30) Foreign Application Priority Data

Jul. 25, 2014    (GB) .................................. 1413204.7

(51) Int. Cl.
| | | |
|---|---|---|
| *B60T 13/125* | (2006.01) |
| *F16D 65/28* | (2006.01) |
| *B60T 13/38* | (2006.01) |
| *B60T 7/02* | (2006.01) |
| *B60T 13/14* | (2006.01) |
| *B60T 13/22* | (2006.01) |
| *B60T 13/26* | (2006.01) |
| *B60T 15/04* | (2006.01) |

(52) U.S. Cl.
CPC ................ *F16D 65/28* (2013.01); *B60T 7/02* (2013.01); *B60T 13/14* (2013.01); *B60T 13/22* (2013.01); *B60T 13/268* (2013.01); *B60T 13/385* (2013.01); *B60T 15/041* (2013.01)

(58) Field of Classification Search
CPC ... F16D 65/28; B60T 7/02; B60T 7/06; B60T 11/21; B60T 13/22; B60T 13/26
USPC .......................................... 303/2, 3, 7, 15, 20
See application file for complete search history.

(56) References Cited

U.S. PATENT DOCUMENTS

| | | | |
|---|---|---|---|
| 3,692,366 A | 9/1972 | Campanini | |
| 4,124,254 A * | 11/1978 | Hart ........................ | B60T 13/26 303/2 |

(Continued)

FOREIGN PATENT DOCUMENTS

WO    2009/156833 A2    12/2009

OTHER PUBLICATIONS

Intellectual Property Office; International Search Report for priority UK Application No. GB1413204.7; dated Jan. 30, 2015.

*Primary Examiner* — Christopher Schwartz

(57) ABSTRACT

A vehicle brake circuit including a brake actuator, a manually operable valve, an electrically operable valve and a fluid reservoir for the supply of fluid to the actuator. The manually operated valve may be connected to the fluid reservoir either directly or indirectly through the electrically operable valve, when its position blocks a direct fluid connection with the fluid reservoir. The electrically operated valve controls activation or deactivation of the actuator except when the mechanically operated valve is in an unblocked position and overrides the electrically operated valves control of the actuator.

8 Claims, 2 Drawing Sheets

(56) References Cited

U.S. PATENT DOCUMENTS

| | | | | |
|---|---|---|---|---|
| 4,856,622 | A | * | 8/1989 | Sartain ..................... B60T 7/08 188/170 |
| 5,050,939 | A | * | 9/1991 | Middelhoven .......... B60T 13/22 188/170 |
| 5,161,862 | A | | 11/1992 | Kunz et al. |
| 5,203,616 | A | * | 4/1993 | Johnson .................. B60T 13/22 188/170 |
| 5,417,479 | A | * | 5/1995 | Wallestad ............. B60T 13/265 303/7 |
| 5,984,425 | A | * | 11/1999 | Orzal .................... B60T 15/041 188/170 |
| 8,615,992 | B2 | * | 12/2013 | Naito ..................... B60T 13/22 188/170 |

\* cited by examiner

PARKING BRAKE

BACKGROUND

Field of Invention

This invention relates to a brake arrangement for a vehicle. In particular, the invention relates to a parking brake arrangement on an agricultural tractor.

SUMMARY

Agricultural tractors are provided with at least one service brake circuit and a parking brake circuit which operates brakes on the front or rear wheels of the tractor. With the increasing number of controls a driver has to contend with inside the cab, it is easy to forget to activate and deactivate the parking brake when parking. If parking on a steep incline this can lead to a heavy load on the transmission which is undesirable. Moreover, upon starting travel in the tractor, the parking brake must be turned off.

WO2009/156833 describes a hydraulic parking brake circuit in which the brake is operable by two manually operable means, or an electric means. The electric means is controlled by a tractor control unit and therefore takes the onus of operating the parking brake from the driver. However, because of the arrangement of the brake circuit, one of the manually operable means is connected to the control unit and the other manual means is a lever which cannot override the electric means whether operated by a control unit or the first manual means. Such an arrangement is uncomfortable.

Accordingly, it is an object of the present invention to provide a vehicle park brake which is operable both by an electric means and a manually operable means and whereby the manually operable means overrides the control of the brake by the electric means. It is a further aim of the invention to provide a vehicle park brake which can easily be used for a hill start.

In accordance with the invention, there is provided A vehicle brake circuit comprising a brake actuator, a first manually operable valve, a second electrically operable valve and a fluid reservoir for the supply of fluid to the actuator, said first valve connectable to the fluid reservoir both directly and via the second valve, said first valve biased in a position such that a direct fluid connection between the fluid reservoir and the first valve is blocked and a fluid connection between the fluid reservoir and the first valve is via the second valve and wherein movement of the second valve controls activation or deactivation of the actuator and wherein movement of the first valve out of the biased position overrides control of the actuator by the second valve.

The vehicle operator can rely on the second valve controlling the brake which may be controlled by a vehicle control unit. Advantageously, the operator can override the control of the actuator by the second valve by activating the first valve. Movement of the first valve may be controlled by a handbrake lever.

Preferably, the actuator is connected to the fluid reservoir via the first valve.

More preferably, the actuator is connected to the fluid reservoir via a relay valve, said relay valve connected to the first valve.

Preferably, the control unit detects different vehicle conditions and positions of the first and second valves. This means that the actuator may be applied or disengaged automatically depending on a sensed condition or parameter of the vehicle.

The brake circuit is preferably a parking brake circuit. More preferably the circuit is a pneumatic circuit.

BRIEF DESCRIPTION OF THE DRAWINGS

The invention will now be described, by way of example only, with reference to the following drawings in which.

DETAILED DESCRIPTION

An agricultural tractor is provided with two or three independent brake circuits. Usually one or two brake circuits operate the service brakes which are applied to the front and rear wheels of the tractor and one brake circuit is provided for operating the parking brake which is usually applied to the front or the rear wheels of the tractor. Each brake circuit has its own fluid reservoir.

Figure 1:
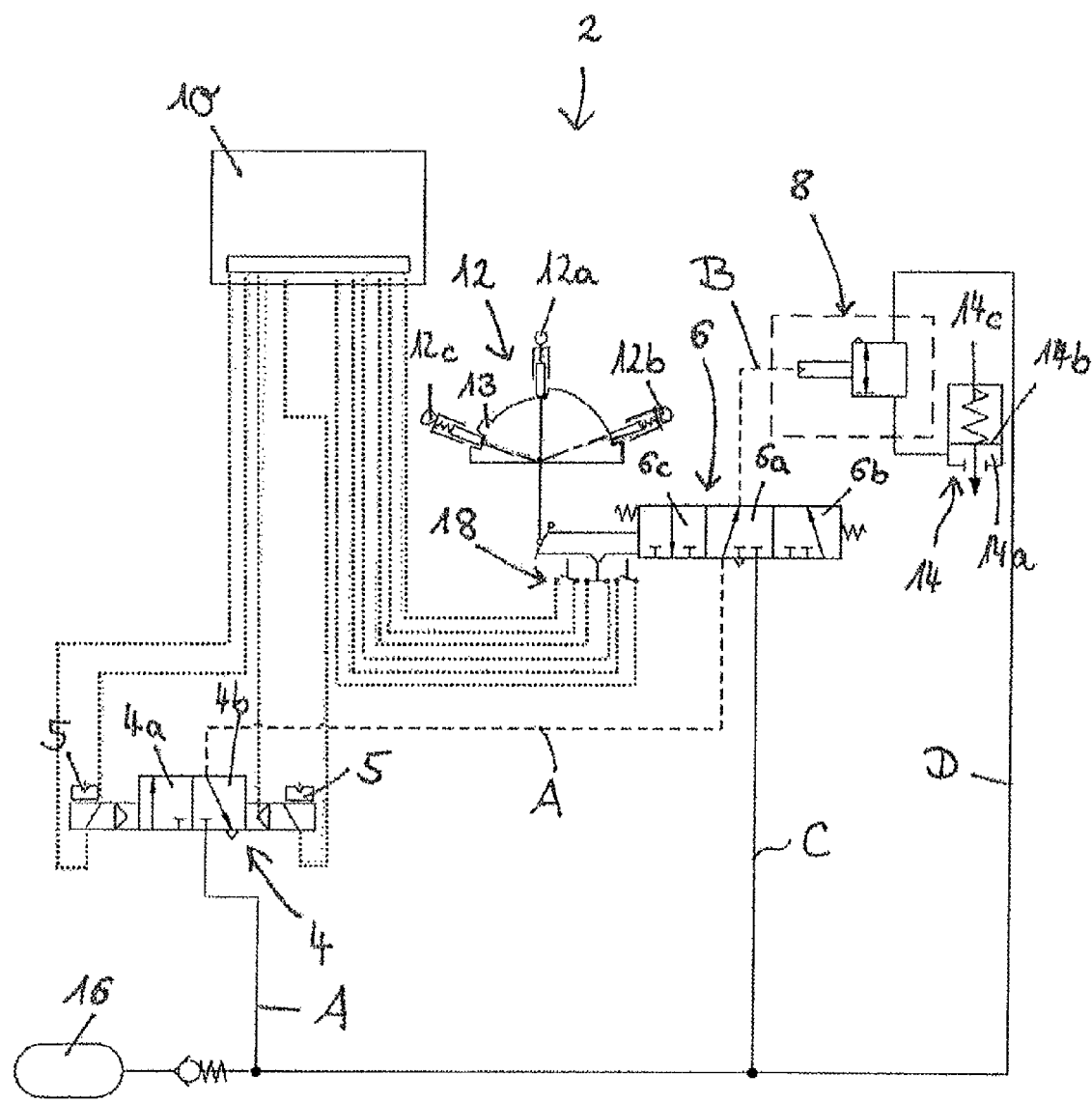
FIG. 1 is a parking brake circuit in accordance with the invention.

FIG. 1 shows a pneumatic parking brake circuit 2 having an electrically operable valve 4 (a 3/2 way valve), a manually operable valve 6 (a 4/3 way valve), a relay valve 8, a fluid reservoir 16 and brake actuation means 14. Fluid reservoir 16 may be an accumulator.

Figure 2:
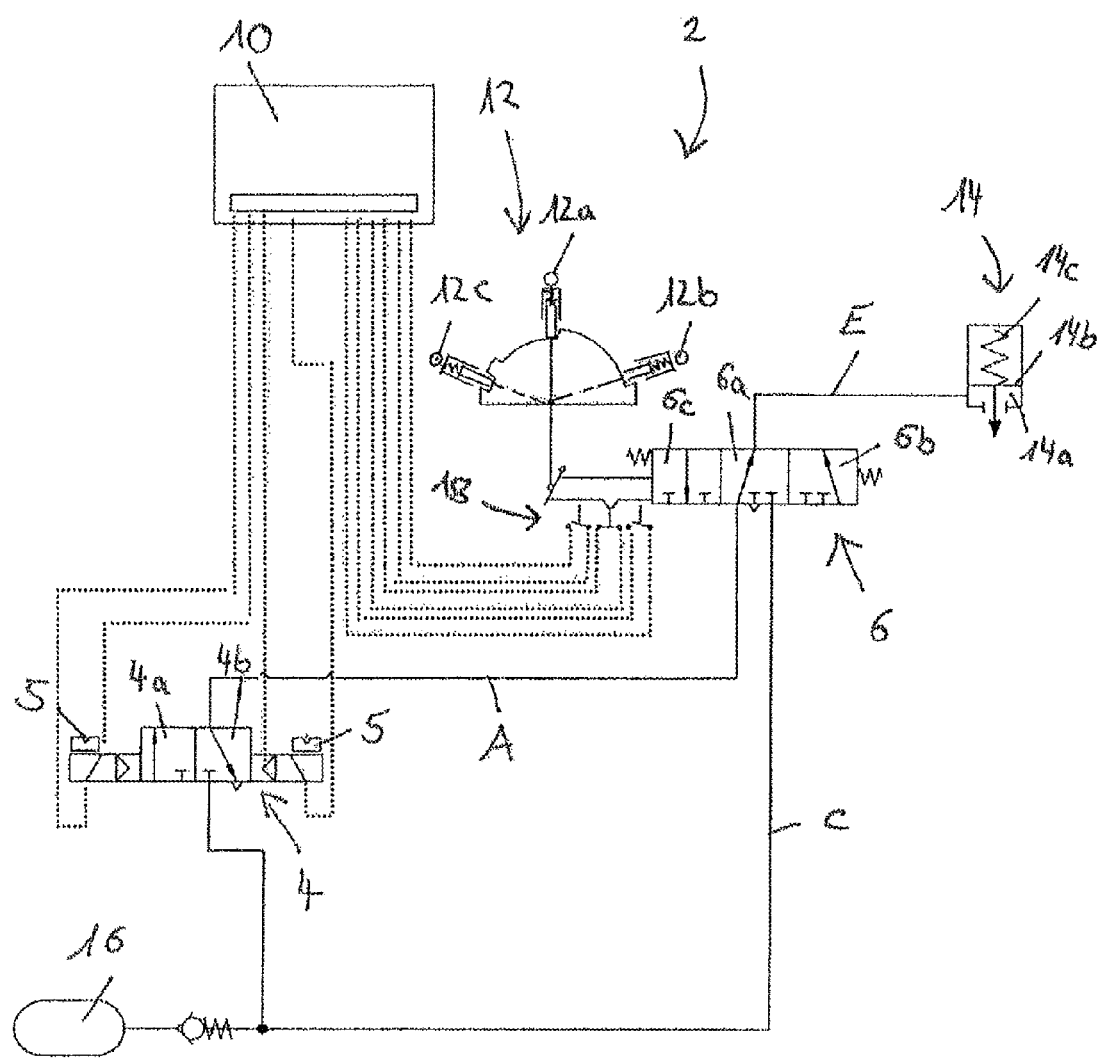
FIG. 2 is an alternative parking brake circuit in accordance with the invention.

FIG. 2 is an alternative brake circuit which is similar to that in FIG. 1 but without the relay valve 8.

The electrically operable valve 4 may be a solenoid valve which can be moved between open and closed positions 4a and 4b and is connected to and operated by a control unit 10 on the tractor. Electrically operable valve 4 is provided with snap-in locking devices 5 to hold the valve 4 in position when moved into position 4a, or 4b. Tractor control unit 10 receives information concerning various parameters which are measured on the tractor, for example tractor speed, or the functioning of the engine. Valve 4 can thus be operated by control unit 10 to apply or disengage the brakes depending on a measured parameter.

The manually operable valve 6 is actuated by a handbrake lever 12 which is moveable by the driver. Lever 12 and valve 6 have three different positions: a biased resting position in which the valve is in position 6a and the lever is in position 12a, an open position in which the valve is in position 6b and the lever is in position 12b and a closed position in which the valve is in position 6c and the lever is in position 12c. Lever 12 and the valve 6 are spring tensioned into the biased resting positions 6a and 12a respectively, so that when no forces are applied to the lever, the valve 6 will rest or move back to position 6a. Lever 12 and therefore valve 6 can be held in the closed positions 6c and 12c respectively by a ratchet 13 on the handbrake lever 12.

The brake actuator 14 comprises a piston chamber 14a inside which a piston 14b is arranged. Piston 14b divides the piston chamber 14a into two chambers. One chamber is provided with a spring element 14c which is in contact with the piston 14b. The other chamber is fluidly connected to the fluid reservoir 16 via the relay valve 8. An end of the piston 14b is in contact with a brake element (not shown). Movement of brake actuator 14 applies and disengages the parking brake or brakes accordingly. An increase in pressure in chamber 14a disengages the brake and causes spring element 14c to compress. A decrease in pressure in chamber 14a causes spring element 14c to expand and apply the brake.

In FIG. 1, valve 6 is shown in the biased resting position 6a. Valve 6 has four ports and in position 6a, two ports of valve 6 are aligned with connections to the reservoir 16 (in which one port is connected to the reservoir 16 via valve 4 by line A and a second port being connected directly to the reservoir 16 by line C). A third port is connected to relay valve 8 by line B and a fourth port is connected to a ventilation outlet. In position 4a, line C is blocked by a closed port and line A is connected to line B by an open port. In position 4b (as shown) one port is aligned with a connection directly to the reservoir, one is connected to ventilation and the other is connected to valve 6. If valve 4 were to be moved from position 4b into the open position 4a by control unit 10, fluid from the reservoir 16 would flow through lines A and B to the relay valve 8 causing it to move so that chamber 14a of the actuator 14 is fluidly connected to the reservoir 16 by line D. An increase in pressure in chamber 14a causes piston 14b to move against the spring 14c and disengage a brake. Normally the handbrake lever 12 and valve 6 are spring tensioned into the biased positions 6a, 12a. When valve 6 is in position 6a, the release or activation of the parking brake occurs via valve 4 which is controlled by the control unit 10

In an automatic mode, the brake may be activated or deactivated automatically depending on an operating condition, or conditions of the tractor, for example, a vehicle speed.

If, for example in an automatic mode the vehicle speed falls below a predetermined value, the control unit senses the drop in speed and will switch the valve 4 to position 4b and relay valve 8 is not activated. As a result, the connection between chamber 14a and the fluid reservoir 16 is blocked and the brake is activated.

If, the vehicle speed exceeds a predetermined value whilst in an automatic mode, the control unit 10 switches the valve 4 to open position 4a and the relay valve 8 is activated via lines A, B so that chamber 14a is connected with the fluid reservoir 16 which leads to the brake being deactivated.

When the tractor is at a standstill when in an automatic mode, the control unit 10 senses that the tractor engine is not operating and will switch valve 4 to the closed position 4b and the brake will be applied.

In a non automatic mode when lever 12 is moved to position 12b, valve 6 is moved to position 6b. In this position line A is blocked and line C is connected to line B so that relay valve 8 is activated and line D is connected to the reservoir 16. Fluid from the reservoir flows into chamber 14a and works against the force of spring 14c to disengage the brake.

If lever 12 is moved to position 12c, valve 6 is moved to position 6c and fluid from line B is vented which closes relay valve 8 causing the brake to be applied.

It can be seen that whether valve 4 or valve 6 is moved to disengage the brake, fluid from the reservoir 16 must pass through valve 6 to enable appropriate actuation of the actuator, but does not have to pass through valve 4. Moreover, when lever 12 is moved to position 12c and therefore valve 6 is moved to position 6c to apply the brake, the two ports between valve 6 and the reservoir, via valve 4 along line A and directly along line C are blocked and therefore movement of valve 4 has no effect.

This means that at any time the driver can override the command of the control unit 10 by using the handbrake lever 12 and moving it out of its biased position 6a and into a desired position. In this way control of the tractor is maintained by the driver.

To release the parking brake, the relay valve 8 is activated and chamber 14a is fluidly connected to the fluid reservoir 16.

Sensor means 18 can be used to detect the position of the handbrake lever 12 and valve unit 6 and inform the control unit 10.

FIG. 2 shows a similar circuit to FIG. 1 but without relay valve 8. In this figure, valve 6 is connectable to chamber 14a of actuator 14 by line E. It can be seen again that whether valve 4, or valve 6 is moved to disengage the brake, fluid from the reservoir 16 must pass through valve 6 to actuator 14. To activate the brake, movement of valve 6 to position 6c blocks the ports between the reservoir and valve 6. As a result movement of the hand lever 12 out of biased position 12a will override any control of the brake by valve 4.

Different operating conditions of the tractor will result in the control unit 10 controlling the brake differently when the valve 6 is in position 6a.

If the tractor is in standstill with the engine off and the brake lever is moved to position 12c and therefore valve 6 moves to position 6c, the brake is applied. The control unit 10 cannot control the brake since the connection of line A to valve 6 is blocked. If the handbrake lever 12 is then moved to position 12b (and therefore valve 6 is moved to position 6b), the brake is released while handbrake lever 12 is held in position 12b. If handbrake lever 12 is moved either manually, or by letting it go to position 12a, valve 6 will move to position 6a The control unit 10 can only be switched off if the brake is applied. This way, if the tractor is not operating (that is the engine is off) and is at a standstill, it is guaranteed that the handbrake is applied. As a result before the control unit is switched off, or powered off, the electric valve 4 must be in position 4b to enable activation of the handbrake.

If the tractor is in standstill with the engine on and handbrake lever 12 is moved to position 12c and therefore valve 6 moves to position 6c, the brake is applied. Control unit 10 cannot control the brake. If handbrake lever 12 is moved to position 12b and therefore valve 6 is moved to position 6b, the brake is released while handbrake 12 lever is held in this position. If handbrake lever is then moved to position 12a manually, or by letting it go, the brake will be applied by valve 4 being moved to position 4b if the control unit 10 detects that no forces are applied through the transmission (indicating the tractor is not moving) or if the driver seat is not seated. If the control unit senses that a driver is seated in the driver's seat, the handbrake is released by moving valve 4 to position 4a.

If the tractor is moving with the engine on, or off and handbrake lever 12 is moved to position 12c and therefore valve 6 is moved to position 6c, the brake is applied. Control unit 10 cannot control the brake. If handbrake lever 12 is moved to position 12b and therefore valve 6 is moved to position 6b, the brake is released while handbrake lever 12 is held in this position. If handbrake lever 12 is moved to position 12a manually, or by letting it go and therefore valve 6 is moved to position 6a, the control unit will move the valve 4 to position 4b so that the parking brake remains in the last braking condition. When the control unit 10 then detects another vehicle condition, it then controls either the release or activation of the parking brake.

In the figures shown the braking circuits are intended for a pneumatic system but a hydraulic system with the same circuits in accordance with the invention is possible.

The braking circuits shown in FIGS. 1 and 2 are intended for a prompt braking action but a gradual braking action is possible if a brake proportioning valve is used.

The invention claimed is:

1. A vehicle brake circuit comprising:
   a brake actuator;
   a first manually operable valve;
   a second electrically operable valve; and
   a fluid reservoir for the supply of fluid to the actuator, said first valve connectable to the fluid reservoir via a direct path, and also via an indirect path by way of the second valve, wherein said first valve is biased in a position such that a direct fluid connection with the fluid reservoir via the direct path is blocked and a fluid connection between the fluid reservoir and the first valve is via the indirect path and the second valve, wherein movement of the second valve controls activation or deactivation of the brake actuator, and wherein movement of the first valve out of the biased position causes a direct fluid connection with the fluid reservoir via the direct path which overrides control of the actuator by the second valve.

2. A vehicle brake circuit as claimed in claim 1 wherein the actuator is connected to the fluid reservoir via the first valve.

3. A vehicle brake circuit as claimed in claim 1 wherein the actuator is connected to the fluid reservoir via a relay valve, said relay valve connected to the first valve.

4. A vehicle brake circuit as claimed in claim 1 wherein the movement of the second valve is controlled by a control unit.

5. A vehicle brake circuit as claimed in claim 4 wherein the control unit detects different vehicle conditions and positions of the first and second valves.

6. A vehicle brake circuit as claimed in claim 1 wherein the movement of the first valve is controlled by a handbrake lever.

7. A vehicle brake circuit as claimed in claim 1 wherein the brake circuit is a parking brake circuit.

8. A vehicle brake circuit as claimed in claim 1 wherein the circuit is a pneumatic circuit.

* * * * *